Oct. 11, 1932.   F. B. ROBERTS ET AL   1,882,038
SIZER
Filed Sept. 6, 1928   2 Sheets-Sheet 1
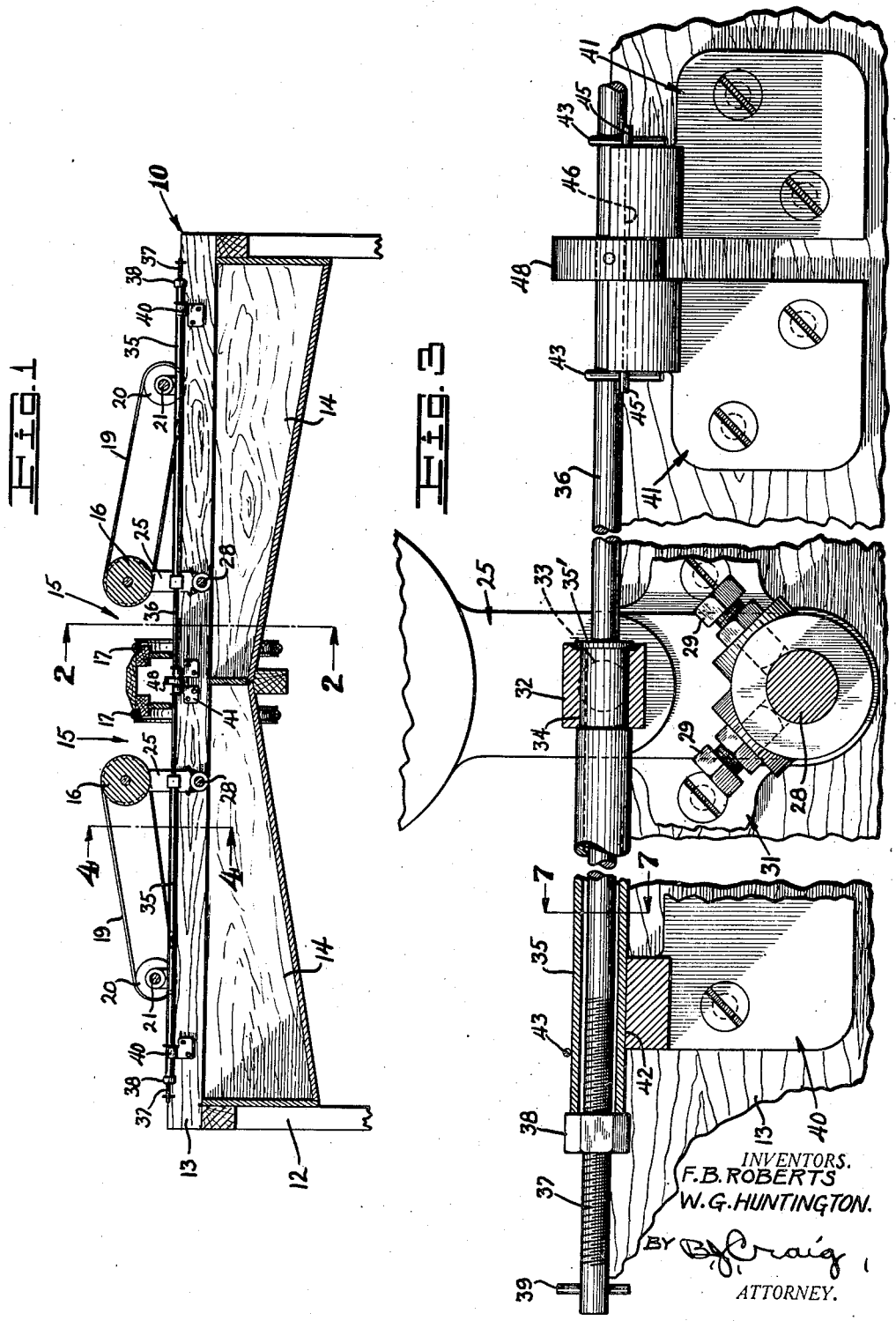
INVENTORS.
F. B. ROBERTS
W. G. HUNTINGTON.
BY B. J. Craig
ATTORNEY.

Oct. 11, 1932.  F. B. ROBERTS ET AL  1,882,038
SIZER
Filed Sept. 6, 1928  2 Sheets-Sheet 2
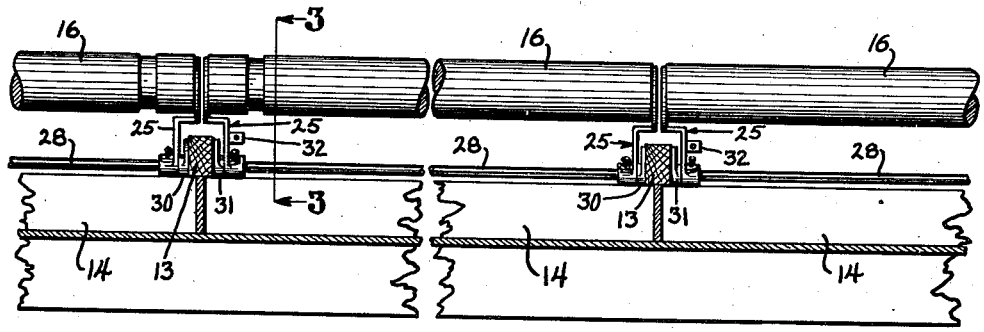
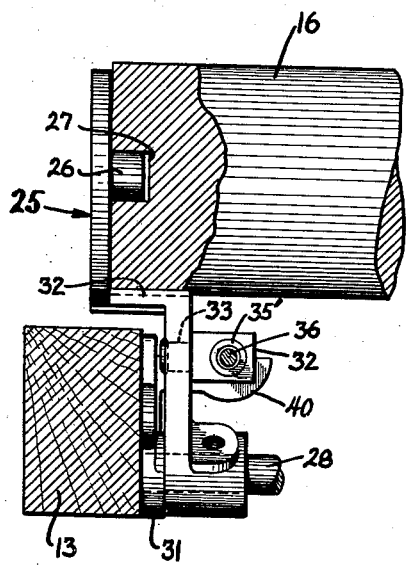
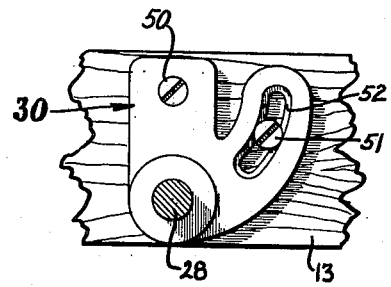
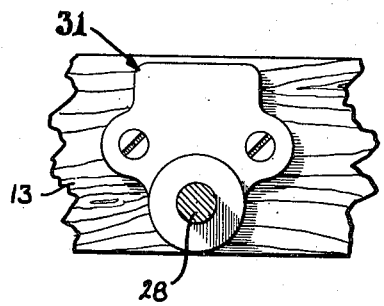
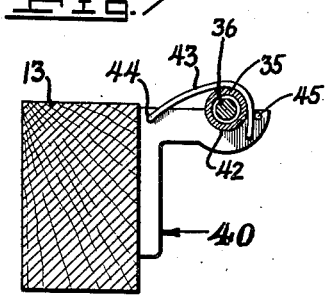
INVENTORS.
F. B. ROBERTS
W. G. HUNTINGTON
BY
ATTORNEY.

Patented Oct. 11, 1932

1,882,038

UNITED STATES PATENT OFFICE

FRANK B. ROBERTS AND WILLIS G. HUNTINGTON, OF ANAHEIM, CALIFORNIA, ASSIGNORS TO FOOD MACHINERY CORPORATION, OF SAN JOSE, CALIFORNIA, A CORPORATION OF DELAWARE

SIZER

Application filed September 6, 1928. Serial No. 304,250.

This invention relates to improvements in sizers.

The general object of the invention is to provide an improved sizing roll mechanism for a fruit sizer.

A further object of the invention is to provide adjusting means for fruit sizers.

A more specific object of the invention is to provide an improved sizer roll mechanism for a double sizer wherein opposite sets of rollers may be simultaneously adjusted or individually adjusted for grading.

Other objects and the advantages of this invention will be apparent from the following description taken in connection with the accompanying drawings wherein:

Fig. 1 is a cross section through a sizer embodying the features of our invention.

Fig. 2 is a section taken on line 2—2 of Fig. 1.

Fig. 3 is an enlarged fragmentary section taken on line 3—3 of Fig. 2 showing one roller support and half of the adjusting mechanism.

Fig. 4 is an enlarged section taken on line 4—4 of Fig. 1 showing one of the roller supports.

Fig. 5 is a face view of one of the adjustable roller support shaft brackets.

Fig. 6 is a face view of one of the stationary roller support brackets and

Fig. 7 is a section taken on line 7—7 of Fig. 3 on a reduced scale showing one of the adjusting rod supporting brackets.

Referring to the drawings by reference characters we have indicated a sizer embodying the features of our invention generally at 10. The sizer shown is of the double sizer type and is particularly adapted for sizing citrus fruit. As shown the sizer comprises a supporting frame 12 including cross beams 13, a plurality of oppositely disposed bins 14, and fruit runways 15. The fruit runways include a plurality of rotatable sizing rollers 16 and a rope belt 17 supported by a guideway 18 which engages and conveys the fruit from one end of the sizer towards the other. As shown, the rollers 16 are adapted to be rotated by belts 19 driven from pulleys 20 on line shafts 21.

The rollers 16 are arranged in spaced pairs with the distance between the different pairs varied. The pair of rollers nearest to the source of fruit supply are closest and as the distance from the fruit supply increases the distance between the rollers is increased. As the fruit is conveyed along the rollers by the rope belts 17 fruit of a small size will first fall between the belt and a roller into the adjacent bin 14. Fruit of the next size will fall into another bin and so on until all the fruit has been delivered into the desired bins.

Our invention relates particularly to a mechanism whereby the distance of the rollers from the rope belts may be accurately and readily adjusted.

In a sizer embodying the features of our invention the rollers 16 are adapted to be supported at each end by brackets 25 having a boss 26 thereon which is adapted to be positioned in a recess 27 in the roller 16 as shown in Fig. 4. Each pair of the brackets 25 is supported on a shaft 28. The brackets are preferably secured to the shaft 28 by set screws 29 as shown in Fig. 3.

Each shaft 28 is adapted to be supported at one end by an adjustable bracket 30 secured to one of the cross beams 13 and at the opposite end by a fixed bracket 31 secured to another of the cross beams 13.

The brackets 25 are preferably offset as indicated at 32 to overlap the adjacent cross beam 13 so that the ends of adjacent rollers will be as close as possible.

One bracket 25 of each pair is provided with a connecting member 32 which is pivotally secured to the bracket as indicated at 33. Each of the members 32 is apertured as at 34 to receive a sleeve 35 which is rotatably secured by a collar 35' and which extends toward the outside of the sizer.

A single rod 36 is positioned in each sleeve 35 and extends from adjacent one side of the sizer to the other. The rod includes an oppositely threaded portion 37 adjacent each end. Nuts 38 welded or otherwise secured to the free ends of the sleeves 35 are adapted to engage the screw threaded portions 37 of the rod 36 and a pin 39 or other suitable wrench engaging means is provided adjacent each end of the rod 36.

The ends of the sleeves 35 adjacent the sides of the sizer are adapted to be supported by brackets 40 secured to one of the cross beams 13 and the rod 36 is adapted to be supported adjacent the center by brackets 41 secured to the cross beams 13.

Each of the brackets 40 includes a bearing surface 42 which encompasses the lower half of the sleeve 35 as shown in Fig. 7. A spring wire 43 secured at one end to the bracket 40 as at 44 is adapted to pass over the top of the sleeve 35 and the free end of the wire is adapted to be held in position by a pin 45 in the bracket. This spring wire 43 resiliently clamps the sleeve 35 to the bracket 40 and thereby prevents the sleeve from accidentally turning.

The brackets 41 are similar to the brackets 40 except for the size of the bearing surface 42 which as indicated at 46 is of a size to fit the rod 36, and the spring wires 43 instead of engaging the sleeves 35, engage and resiliently clamp the rod 36 to the brackets 41, thereby preventing the accidental turning of the rod 36.

When it is desired to adjust one of a pair of opposite rollers 16 as when each roller of the sizer is adapted to segregate a different size of fruit, a wrench is put on the nut 38 and the sleeve 35 turned, whereupon the screw threads 37 on the rod 36 will cause the sleeve to move either towards or away from the rope belt 17, thereby moving the bracket 25. When the roller bracket having the member 32 thereon is moved it will rotate the shaft 28 and move the bracket 25 which supports the opposite end of the roller.

When it is desired to adjust both of a pair of opposite rollers 16 as when both of the rollers in a set are adapted to segregate the same size fruit, a wrench is applied to either end of the rod 36 and the rod turned. As the rod 36 is turned the spring wire clamps 43 on the brackets 40 prevent the sleeve 35 from turning thereby causing the sleeves to both move either towards each other or away from each other, owing to the opposite threads 37 on the rod 36.

To prevent the rod 36 from moving laterally a collar 48 is secured to the rod 36 and is adapted to abut each of the center supporting brackets 41.

As shown in Fig. 5 the adjustable shaft supporting bracket 30 is secured to the cross beam 13 by a screw 50 and by a screw 51 which is adapted to be positioned in a curved slot 52, the center of the arc of which corresponds to the screw 50. By loosening the screw 51 the bracket may be swung on the screw 50 to the desired position and when the screw 51 is tightened it will hold the bracket in the adjusted position.

The bracket 30 is made adjustable so that when the sizer is being set up the adjacent ends of the rollers 16 may be readily aligned so that there will not be a step between the end of one roller and the next. After the rollers have once been aligned it is not necessary to again move the bracket 30 unless a roller is accidentally moved.

From the foregoing description it will be apparent that I have provided an improved mechanism whereby the rollers of a sizer may be quickly and accurately adjusted both singly and in pairs and one which is simple in construction and efficient in use.

Having described my invention, I claim:

1. In a fruit sizer including a runway, one side of said runway being formed by a plurality of rollers, said rollers extending end to end along said sizer, a bracket adjacent to each end of each of said rollers, a connecting member pivotally connected to one of each pair of brackets, a sleeve rotatably mounted on each of said pivoted members and extending thereon towards the side of said sizer, a rod passing through said sleeve and extending to one side of said sizer, means connecting said rod and said sleeve, means adapted to resiliently clamp said sleeve to prevent accidental turning of said sleeve, means adapted to resiliently clamp said rod to prevent accidental turning of said rod, means adapted to prevent accidental lateral movement of said rod, and means whereby said sleeve upon rotation will move its associated roller.

2. In a fruit sizer including a double runway, one side of each of said runways being formed by a plurality of rollers, said rollers of both sides of said runways being in oppositely disposed pairs and extending end to end along said sizer, each of said rollers being supported by a bracket adjacent each end, said roller supporting brackets at one end of each pair of oppositely disposed pairs of rollers having a member pivotally secured thereto, a sleeve rotatably secured to each of said pivoted members and extending in opposite directions towards the side of said sizer, a rod, means connecting said rod and said sleeves, means whereby said sleeves upon rotation individually move their associated roller supporting brackets and whereby said rod upon rotation moves both of its associated roller supporting brackets simultaneously.

3. In a fruit sizer including a double runway, one side of each of said runways being formed by a plurality of rollers, said rollers being in oppositely disposed pairs and extending end to end along said sizer, a bracket adjacent to each end of each of said rollers, a connecting member pivotally connected to one of each pair of brackets, a sleeve rotatably mounted on each of said pivoted members and extending therefrom towards the side of said sizer, said sleeves being arranged in opposed pairs, a rod passing through opposed sleeves and extending to each side of said sizer, means connecting said rod and said sleeves, means adapted to resiliently clamp said sleeves to prevent accidental turning of said sleeves, means adapted to resiliently clamp said rod to prevent accidental turning of said rod, means adapted to prevent accidental lateral movement of said rod and means whereby said sleeves, upon rotation independently move their associated roller supporting brackets and whereby said rod upon rotation moves both of its associated roller supporting brackets simultaneously.

4. In a fruit sizer including a double runway, one side of each of said runways being formed by a plurality of rollers, said rollers of both sides of said runways being in oppositely disposed pairs and extending end to end along said sizer, each of said rollers being supported by a bracket adjacent each end, said brackets being secured to a shaft and being adjustable on said shaft, shaft supporting brackets adapted to support each end of said shaft, said roller supporting brackets at one end of each pair of oppositely disposed pairs of rollers having a member pivotally secured thereto, a sleeve rotatably secured to each of said pivoted members, the sleeves associated with opposed rollers extending in opposite directions towards the sides of said sizer, a nut secured adjacent the free end of each sleeve, a rod, said rod being positioned in both of said sleeves, oppositely disposed screw threaded portions adjacent each end of said rod, said nuts on said sleeve engaging the adjacent screw threaded portions of said rod, a wrench engaging means adjacent each end of said rod, a supporting bracket adjacent the free end of each of said sleeves, a pair of spaced supporting brackets for said rod intermediate the length of said rod, a collar secured to said rod, said collar being positioned between said rod supporting brackets and adapted to prevent lateral movement of said rod, each of said sleeves upon rotation being adapted to individually move its associated roller supporting bracket and said rod upon rotation being adapted to move both of its associated roller supporting brackets simultaneously.

5. In a fruit sizer including a double runway, one side of each of said runways being formed by a plurality of rollers, said rollers of both sides of said runway being in oppositely disposed pairs and extending end to end along said sizer, each of said rollers being supported by a bracket adjacent each end, said brackets being adjustably secured to a shaft, shaft supporting brackets adapted to support each end of said shaft, one of said brackets being fixed and the other of said brackets being adjustable, said roller supporting brackets at one end of each pair of oppositely disposed pairs of rollers having a member pivotally secured thereto, a sleeve rotatably secured to each of said pivoted members and extending in opposite directions towards the side of said sizer, a nut secured adjacent the free end of each sleeve, a rod, said rod being positioned in both of said sleeves, oppositely disposed screw threaded portions adjacent each end of said rod, said nuts on said sleeves being in engagement with the adjacent screw threaded portions of said rod, wrench engaging means adjacent each end of said rod, a supporting bracket adjacent the free end of each of said sleeves, said supporting brackets encompassing the lower portion of said sleeves and including means adapted to resiliently clamp said sleeves to said brackets to prevent accidental turning of said sleeves, a pair of spaced supporting brackets for said rod intermediate the length of said rod, said rod supporting brackets including means adapted to resiliently clamp said rod thereto to prevent accidental turning of said rod, a collar secured to said rod, said collar being positioned between said rod supporting brackets and adapted to prevent lateral movement of said rod, each of said sleeves upon rotation being adapted to individually move its associated roller supporting bracket and said rod upon rotation being adapted to move both of its associated roller supporting brackets simultaneously.

6. In a fruit sizer including a double runway, one side of each of said runways being formed by a plurality of rollers, said rollers of both sides of said runways being in oppositely disposed pairs and extending end to end along said sizer, each of said rollers being supported by a bracket adjacent each end, said roller supporting brackets at one end of each pair of oppositely disposed pairs of rollers having a member pivotally secured thereto, a member secured to each of said pivoted members and extending in opposite directions towards the side of said sizer, a rod, means connecting said rod and said members, means whereby said members upon actuation individually move their associated roller supporting brackets and whereby said rod upon actuation moves both of its associated roller supporting brackets simultaneously.

7. In a fruit grader, a multiple runway comprising a plurality of rows of grading rollers in each of which the rollers are arranged in end to end relation, whereby to form a plurality of sets of oppositely disposed rollers, traveling members adapted to convey pieces of fruit along the rollers, a separate unitary means associated with each roller for bodily shifting said roller independently of the others, and a separate unitary means associated with each set of rollers for bodily shifting said set of rollers with respect to the traveling members simultaneously and independently of the other sets.

8. In a fruit grader, a multiple runway comprising a plurality of rows of grading rollers in each of which the rollers are arranged in end to end relation, whereby to form a plurality of sets of oppositely disposed rollers, traveling members adapted to convey pieces of fruit along the rollers, means to adjust the angularity of each roller with respect to the traveling members independently of the others, a separate unitary means associated with each roller for bodily shifting said roller independently of the others, and a separate unitary means associated with each set of rollers for adjusting their positions with respect to the traveling members simultaneously and independently of the other sets.

9. In a fruit grader, a runway formed by a plurality of rollers arranged in end to end relation and means for conveying pieces of fruit therealong, a separate shaft beneath each roller and coextensive therewith, a pair of spaced supports keyed to each shaft, means for rotatably supporting a roller between each pair of supports, individual means for turning each shaft independently of the others whereby its associated roller is bodily moved, and individual means for shifting one end of each shaft independently of the others to change the argularity of its associated roller with respect to the conveying means.

10. In a fruit grader, a multiple runway comprising a plurality of rows of grading rollers in each of which the rollers are arranged in end to end relation, whereby to form a plurality of sets of oppositely disposed rollers, traveling members adapted to convey pieces of fruit along the rollers, a separate shaft beneath each roller and coextensive therewith, a pair of spaced supports keyed to each shaft, means for rotatably supporting a roller between each pair of supports, a separate unitary means associated with each set of opposite shafts for simultaneously turning the same independently of the other sets whereby the associated set of rollers are bodily moved, individual unitary means associated with each shaft for turning the same independently of the others, and individual means for varying the angularity of each roller with respect to the conveying means and independently of the other rollers.

11. In a sizer, a double runway including a plurality of pairs of independently mounted, oppositely disposed rollers, and traveling means adapted to convey articles along said rollers, means to adjust each roller bodily and independently of the others towards and from the traveling means, and a second adjustable means telescopically arranged with respect to said first mentioned adjusting means and movable coaxially relative thereto for simultaneously moving two opposite rollers to vary the distance thereof from said traveling means.

12. In a sizer, a plurality of independently mounted rollers placed end to end, a second plurality of rollers placed end to end and in parallel relation with said first plurality of rollers to provide a plurality of opposed pairs of rollers, a pair of spaced traveling members, one of said members being associated with each plurality of rollers, linearly movable means for moving each of said rollers independently of the others to vary the distance between each roller and its associated traveling member, and other means telescopically associated with and movable coaxially relative to said linearly movable means for simultaneously moving each pair of opposite rollers independently of the others to vary the distance thereof from the associated traveling members.

13. In a fruit grader, a multiple runway comprising a plurality of rows of grading rollers in each of which the rollers are arranged in end to end relation whereby to form a plurality of sets of oppositely disposed rollers, traveling members adapted to convey pieces of fruit along the rollers, a separate shaft adjacent each roller and extending parallel therewith, a pair of spaced supports keyed to each shaft, means for rotatably supporting a roller between each pair of supports, a separate unitary means associated with each set of opposite shafts for simultaneously turning the same independently of the other sets whereby the associated set of rollers may be moved bodily toward and away from the traveling members, and individual unitary means associated with each shaft for turning the same independently of the others to move its associated roller bodily.

14. In a fruit grader, a multiple runway comprising a plurality of rows of grading rollers in each of which the rollers are arranged in end to end relation whereby to form a plurality of sets of oppositely disposed rollers, traveling members adapted to convey pieces of fruit along the rollers, a separate shaft adjacent each roller and extending parallel therewith, a pair of spaced supports keyed to each shaft, means for rotatably supporting a roller between each pair of supports, and a separate unitary adjusting means associated with each set of opposite shafts and including an operating member extending transversely of the grader for simultaneously turning its associated set of shafts independently of the other sets whereby the rollers carried by said shafts may be moved bodily toward and away from the traveling members.

15. In a fruit grader, a multiple runway comprising a plurality of rows of independently mounted grading rollers in each of which the rollers are arranged in end to end relation whereby to form a plurality of sets of oppositely disposed rollers, traveling members for conveying pieces of fruit along the rollers of each row, an individual unitary adjusting means including a transversely extending operating member associated with each roller for bodily shifting said roller toward and away from said traveling means independently of the other rollers, and a plurality of individual secondary unitary adjusting means extending transversely of the grader, one of which is interconnected with each pair of operating members whereby actuation of an operating member moves its associated roller individually and independently of the other rollers, and actuation of said secondary adjusting means actuates both operating members connected therewith to simultaneously shift the rollers associated with said members bodily and in unison.

16. In a fruit sizer, a multiple runway comprising a plurality of rows of independently mounted grading rollers in each of which the rollers are arranged in end to end relation whereby to form a plurality of sets of oppositely disposed rollers, traveling members for conveying pieces of fruit along each row of rollers, a pair of pivotally mounted supporting brackets for each roller, between which the roller is rotatably journalled, means interconnecting each pair of brackets to cause them to move in unison, a plurality of rotatable shafts, each of which is so associated with one of the brackets of each pair as to shift the bracket upon rotation of the shaft, the shafts associated with opposite brackets extending to opposite sides of the sizer, a plurality of rotatable rods extending transversely of the sizer, means interconnecting each of said rods with one of the pairs of oppositely extending shafts whereby rotation of a shaft shifts its associated bracket individually, and rotation of a rod simultaneously shifts both brackets associated with those shafts connected with said rod.

17. In a fruit grader, a multiple runway comprising a plurality of rows of independently mounted grading rollers in each of which the rollers are arranged in end to end relation whereby to form a plurality of sets of oppositely disposed rollers, traveling members for conveying pieces of fruit along the rollers of each row, a pair of supporting brackets for supporting each roller independently of the others and between which the rollers are rotatably journalled, the brackets of each pair being interconnected for simultaneous movement whereby to shift their associated rollers bodily, a plurality of individual unitary adjusting means, each of which includes an operating member operative to shift one pair of brackets independently of the other pairs to bodily move its associated roller towards and away from the traveling members, and a plurality of individual secondary unitary adjusting means extending transversely of the grader, each of which is operatively interconnected with a pair of operating members for opposed rollers whereby actuation of an operating member moves its associated roller individually and independently of the other rollers and actuation of said secondary adjusting means actuates both operating members connected therewith to simultaneously shift the rollers associated with said members bodily and in unison.

18. In a fruit sizer, a multiple runway comprising a plurality of rows of independently mounted grading rollers in each of which the rollers are arranged in end to end relation whereby to form a plurality of sets of oppositely disposed rollers, traveling members for conveying pieces of fruit along each row of rollers, a pair of pivotally mounted supporting brackets for each roller, between which the roller is rotatably journalled, means interconnecting each pair of brackets to cause them to move in unison, a unitary individual operating member for each pair of brackets actuatable to shift its corresponding pair of brackets towards and away from the traveling members independently of the other brackets, and a second unitary individual operating member for each set of opposite pairs of brackets actuatable to shift the opposite pairs of brackets towards and away from each other, simultaneously and independently of the other sets.

In testimony whereof, we hereunto affix our signatures.

FRANK B. ROBERTS.
WILLIS G. HUNTINGTON.